US012535198B2

(12) United States Patent
Chen

(10) Patent No.: US 12,535,198 B2
(45) Date of Patent: Jan. 27, 2026

(54) STRUCTURE OF Christmas LAMP HOLDER

(71) Applicant: Tse-Ching Chen, Hsinchu (TW)

(72) Inventor: Tse-Ching Chen, Hsinchu (TW)

( * ) Notice: Subject to any disclaimer, the term of this patent is extended or adjusted under 35 U.S.C. 154(b) by 281 days.

(21) Appl. No.: 18/378,204

(22) Filed: Oct. 10, 2023

(65) Prior Publication Data

US 2025/0116394 A1 Apr. 10, 2025

(51) Int. Cl.

| | |
|---|---|
| ***F21V 21/002*** | (2006.01) |
| ***F21S 4/10*** | (2016.01) |
| ***F21V 21/088*** | (2006.01) |

(52) U.S. Cl.

CPC .............. *F21V 21/002* (2013.01); *F21S 4/10* (2016.01); *F21V 21/088* (2013.01)

(58) Field of Classification Search

CPC .. F21V 21/002; F21V 21/088; F21V 19/0005; F21V 19/0025; F21S 4/10; H01R 13/58; H01R 33/09; H01R 13/7032

See application file for complete search history.

(56) References Cited

U.S. PATENT DOCUMENTS

| | | | | |
|---|---|---|---|---|
| 3,372,362 A * | 3/1968 | Schick | F21V 21/002 | 439/419 |
| 5,350,315 A * | 9/1994 | Cheng | H01R 33/22 | 439/666 |
| 5,446,640 A * | 8/1995 | Lin | H01R 4/2406 | 362/396 |
| 5,738,435 A * | 4/1998 | Lin | H01R 33/9651 | 362/267 |
| 5,876,236 A * | 3/1999 | Chen | F21V 21/002 | 439/280 |
| 5,954,425 A * | 9/1999 | Lin | F21S 4/10 | 362/294 |
| 6,305,828 B1 * | 10/2001 | Huang | H01R 33/22 | 362/396 |
| 7,955,119 B2 * | 6/2011 | Li | H01R 13/58 | 439/460 |

* cited by examiner

*Primary Examiner* — Edwin A. Leon
(74) *Attorney, Agent, or Firm* — Demian K. Jackson; Jackson IPG PLLC

(57) ABSTRACT

An improved structure of Christmas lamp holder including a lamp cover and a lamp holder body is so configured that when the lamp cover and the lamp holder body are engaged and fixed, in addition to pressing the electrical wire through the pressing block of the lamp cover, at the same time, the first and second pressing protrusions of the pressing block of the lamp cover press the outer insulation layer of the electrical wire to achieve a more stable pressing fixation effect and increase the load-bearing tensile force to obtain a better tensile effect.

3 Claims, 6 Drawing Sheets

STRUCTURE OF Christmas LAMP HOLDER

BACKGROUND AND SUMMARY OF THE INVENTION

The present invention relates to Christmas lamp holder technology and more particularly to an improved structure of Christmas lamp holder, which is so designed that when the pressing block of the lamp cover presses the electrical wire, it further presses the outer insulation layer of the electrical wire through at least one first pressing protrusion and at least one second pressing protrusion, so as to achieve stable tight fixation and better tensile effect.

Prior art technology, such as U.S. Pat. No. 6,305,828 B1, discloses relevant technical content that when the lamp cover is engaged and fixed with a body, the wire can be pressed through the first and second grooves of the pressing block of the lamp cover. Although the tips of the positive and negative conductive sheets are respectively inserted into the outer insulation layer of the electrical wire and then contact the core wires on both sides of the wire, however, it has been found that its tensile strength is poor, its stability is still insufficient, and it is easy for the Christmas lamp holder to shift and needs to be improved.

SUMMARY OF THE INVENTION

In view of this, the inventor of the present invention finally created and designed an improved structure of Christmas lamp holder after continuous research, improvement and testing.

It is therefore the main object of the present invention to provide an improved structure of Christmas lamp holder, which is so designed that when the pressing block of the lamp cover presses the electrical wire, it further presses the outer insulation layer of the electrical wire through first and second pressing protrusions, so as to achieve stable tight fixation and better tensile effect.

DETAILED DESCRIPTION OF THE INVENTION

Figure 1:
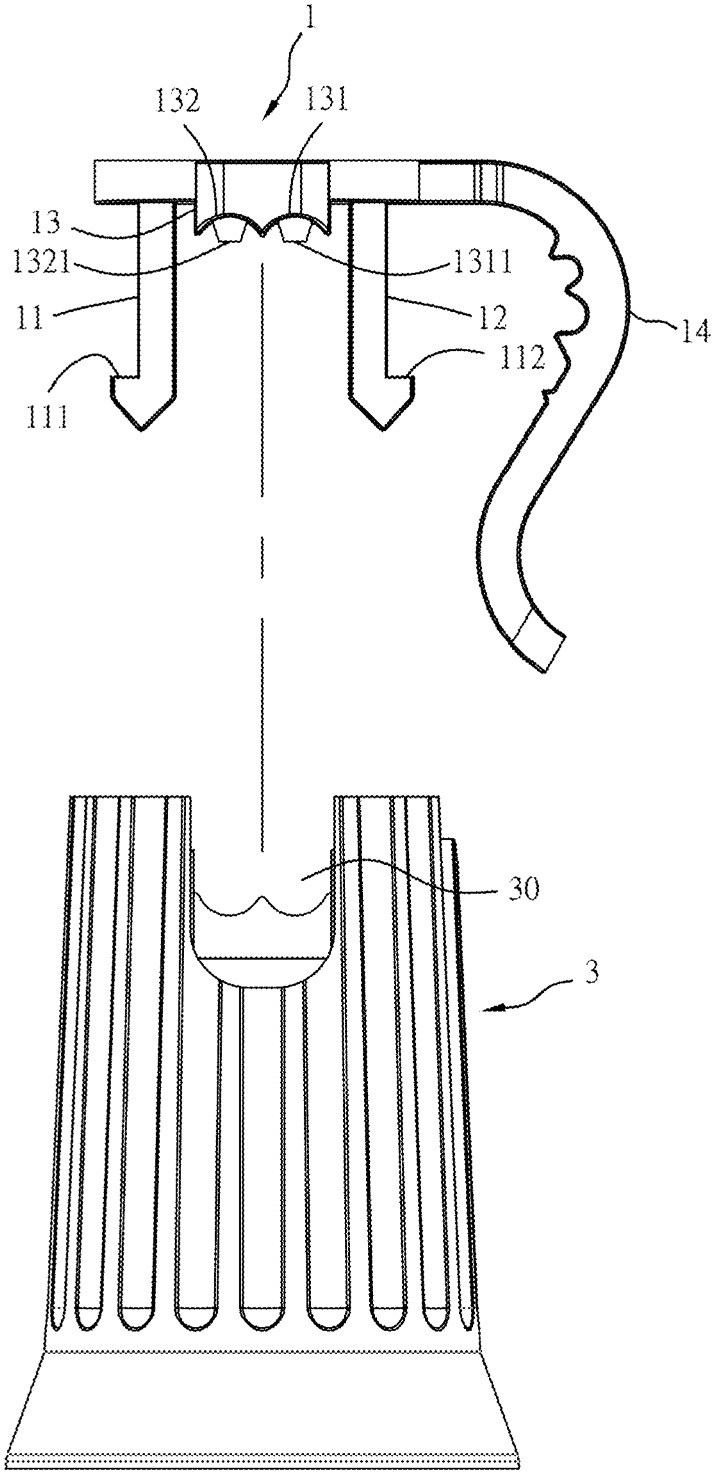
FIG. 1 is an exploded plan view of the lamp cover and the lamp holder body of the present invention.
Figure 2:
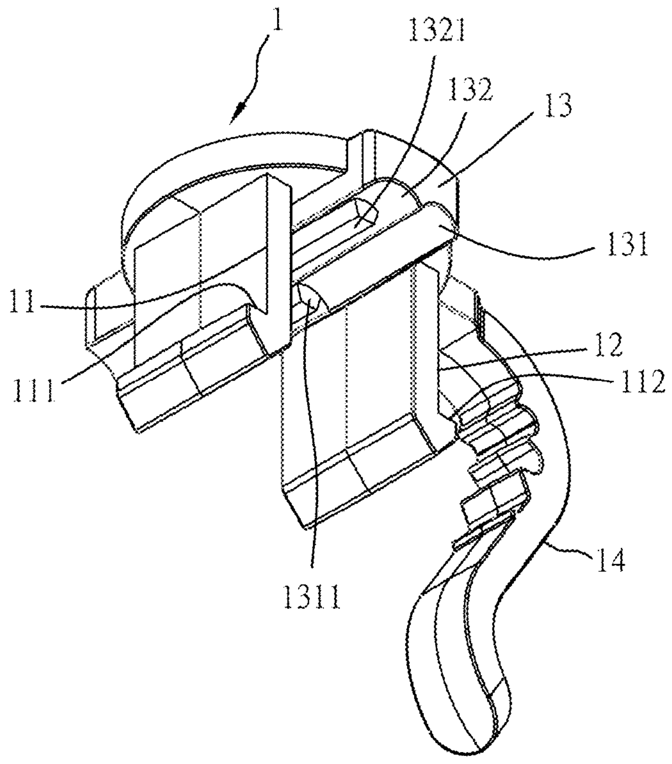
FIG. 2 is an oblique bottom elevational view of the lamp cover of the present invention.
Figure 3:
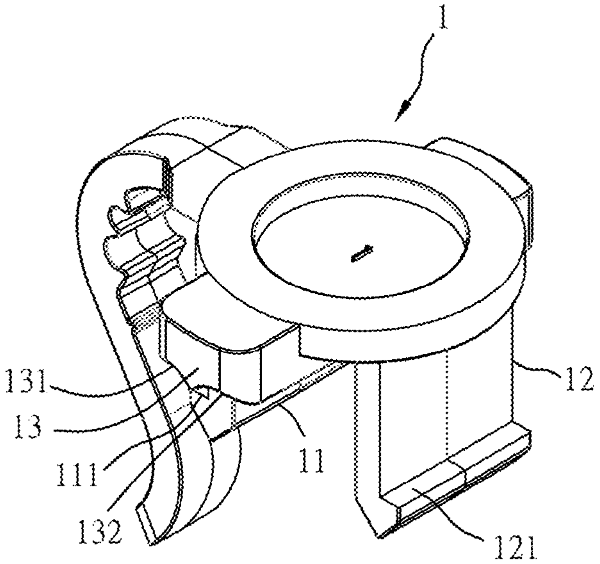
FIG. 3 is an oblique top elevational view of the lamp cover of the present invention.
Figure 4:
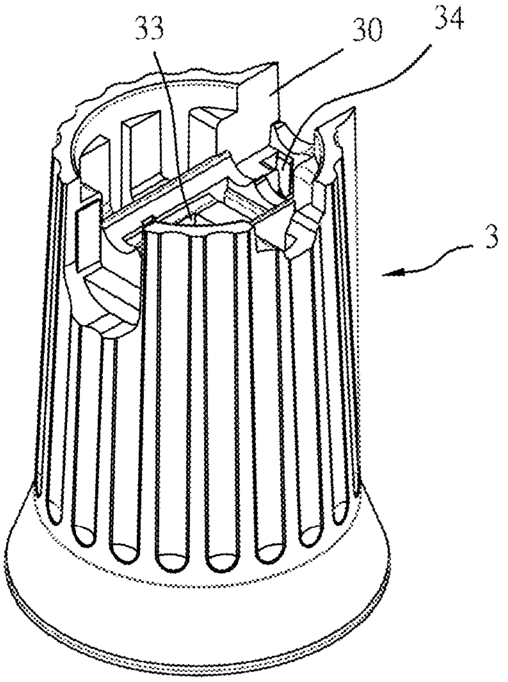
FIG. 4 is an oblique top elevational view of the lamp holder body of the present invention.
Figure 5:
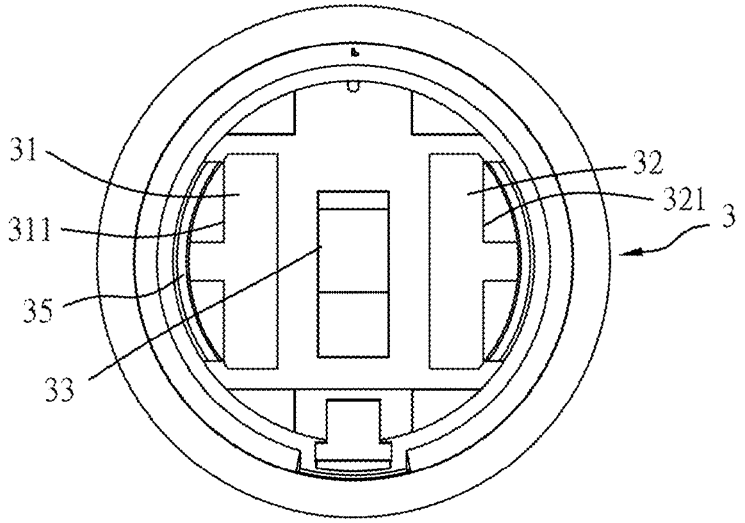
FIG. 5 is a bottom plan view of the lamp holder body of the present invention.

As shown in FIG. 1 to FIG. 6, the invention is an improved structure of Christmas lamp holder, which comprises a lamp cover 1 and a lamp holder body 3.

The lamp cover 1 comprises a first hook 11 and a second hook 12, and also comprises a pressing block 13 located between the first hook 11 and the second hook 12. The pressing block 13 also forms a first groove 131 and a second groove 132 for correspondingly pressing an electrical wire 2 (see also FIG. 6). One side of the lamp cover 1 is provided with a clip 14.

Figure 6:
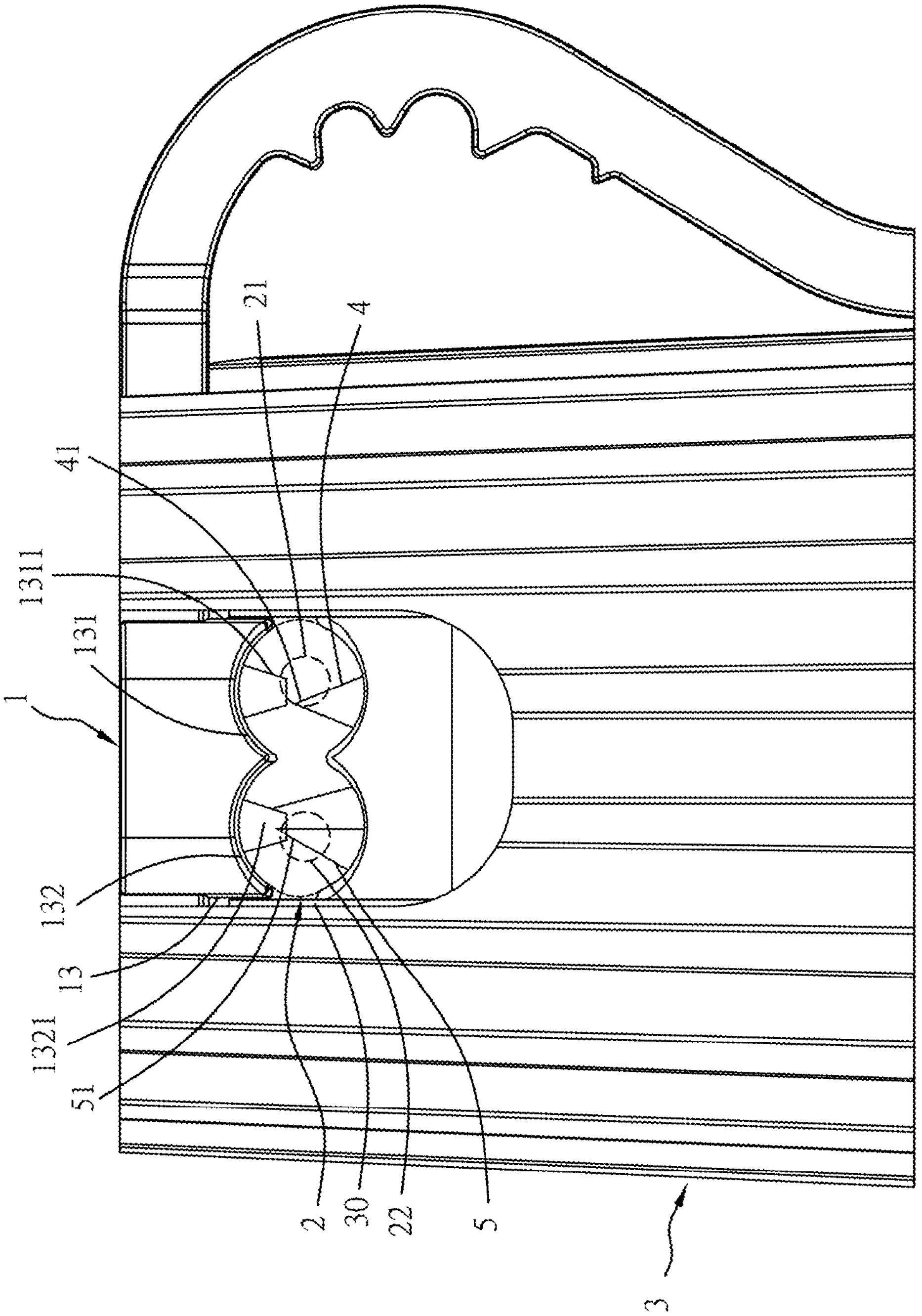
FIG. 6 is an enlarged schematic diagram of a partially assembled plane of the embodiment of the present invention.

The lamp holder body 3 is provided with a wiring slot 30 for installing an electrical wire 2 (see FIG. 6). The lamp holder body 3 is also provided with a first retaining slot 31 (also refer to FIG. 5) and a second retaining slot 32 for the insertion of the first hook 11 and the second hook 12 of the lamp cover 1 respectively, so that a hook portion 111 of the first hook 11 and a hook portion 112 of the second hook 12 can be respectively locked on a first wall surface 311 (see FIG. 5) adjacent to the inner end of the first retaining slot 31 and a second wall 321 adjacent to the inner end of the second retaining slot 32. In this way, the lamp cover 1 and the lamp holder body 3 can be engaged and fixed through the first retaining slot 31 and the second retaining slot 32 (see FIG. 5), and the first hook 11 and the second hook 12. The lamp holder body 3 is also provided with a first positioning groove 33 and a second positioning groove 34 for respectively installing a positive conductive sheet 4 and a negative conductive sheet 5 (see FIG. 6). The tip 41 (see FIG. 6) of the positive conductive sheet 4 and the tip 51 (see FIG. 6) of the negative conductive sheet 5 are respectively located in the wiring slot 30. In addition, the lamp holder body 3 is provided with internal threads 35 (see FIG. 5) for screw-locking connection with the ring contact (not shown) of the lamp base (not shown) of a lamp bulb (not shown), and the tip contact (not shown) of the lamp base of the lamp bulb is electrically connected to the other end (not shown) of the positive conductive sheet 4.

Thereby, after the electrical wire 2 (see FIG. 6) is installed into the wiring slot 30 of the lamp holder body 3, the lamp cover 1 can be engaged and fixed with the first retaining slot 31 and second retaining slot 32 of the lamp holder body 3 through its first hook 11 and second hook 12, and the electrical wire 2 can be pressed by the first groove 131 and the second groove 132 of the pressing block 13 of the lamp cover 1, so that the tip 41 of the positive conductive sheet 4 is inserted into the outer insulation layer of the electrical wire 2 on one side and then contacts the core wire 21 on the same side of the electrical wire 2 (see FIG. 6), and the tip 51 of the negative conductive sheet 5 is inserted into the outer insulation layer of the electrical wire 2 on the other side and then contacts the core wire 22 on the other side of the electrical wire 2 (see FIG. 6).

The invention is characterized in that:

The first groove 131 and the second groove 132 of the pressing block 13 of the lamp cover 1 are respectively provided with at least one first pressing protrusion 1311 and at least one second pressing protrusion 1321, so that at the time the tip 41 of the positive conductive sheet 4 is inserted into the outer insulation layer of the electrical wire 2 on one side and then contacts the core wire 21 on the same side of the electrical wire 2, and the tip 51 of the negative conductive sheet 5 is inserted into the outer insulation layer of the electrical wire 2 on the other side and then contacts the core wire 22 on the other side of the electrical wire 2, the outer insulation layer of the electrical wire 2 is further pressed by the at least one first pressing protrusion 1311 and the at least one second pressing protrusion 1321 to achieve more stable pressing fixation and better tensile effect, which relatively increases the load-bearing tensile force and can prevent the Christmas lamp holder from shifting and also improve its service life.

Furthermore, in this embodiment, the at least one first pressing protrusion 1311 and the at least one second pressing protrusion 1321 of the pressing block 13 of the lamp cover 1 are strip-shaped, but they may actually be block-shaped or other geometric shapes.

In addition, the at least one first pressing protrusion 1311 and the at least one second pressing protrusion 1321 of the pressing block 13 of the lamp cover 1 are used to further press the outer insulation layer of the electrical wire 2 without interfering with the core wire 21 on the one side of the electrical wire 2 and the core wire 22 on the other side of the electrical wire 2.

To sum up, through the characteristics of the present invention that the first groove 131 and the second groove 132 of the pressing block 13 of the lamp cover 1 are respectively provided with at least one first pressing protrusion 1311 and at least one second pressing protrusion 1321, when the lamp cover 1 and the lamp holder body 3 are engaged and fixed, the electrical wire 2 can be pressed by the first groove 131 and the second groove 132 of the pressing block 13 of the lamp cover 1, and at the same time, the outer insulation layer of the electrical wire 2 is further pressed by the at least one first pressing protrusion 1311 and the at least one second pressing protrusion 1321 to achieve more stable pressing fixation and better tensile effect, which relatively increases the load-bearing tensile force and can prevent the Christmas lamp holder from shifting and also improve its service life.

What is claimed is:

1. An improved structure of a Christmas lamp holder, comprising:

a lamp cover comprising a first hook, a second hook, a pressing block located between said first hook and said second hook, and a clip provided on one side thereof, said pressing block providing a first groove and a second groove for correspondingly pressing an electrical wire;

a lamp holder body comprising a wiring slot for installing said electrical wire, a first retaining slot and a second retaining slot for the insertion of said first hook and said second hook of said lamp cover respectively, so that a hook portion of said first hook and a hook portion of said second hook are respectively locked on a first wall surface adjacent to an inner end of said first retaining slot and a second wall adjacent to an inner end of said second retaining slot, and said lamp cover and said lamp holder body are engaged and fixed through said first retaining slot and said second retaining slot, said first hook and said second hook, said lamp holder body further comprising a first positioning groove and a second positioning groove for respectively installing a positive conductive sheet and a negative conductive sheet for enabling a tip of said positive conductive sheet and a tip of said negative conductive sheet to be respectively located in said wiring slot, said lamp holder body being internally provided with internal threads;

thereby, after said electrical wire is installed into said wiring slot of said lamp holder body, said lamp cover is engaged and fixed with said first retaining slot and said second retaining slot of said lamp holder body through said first hook and said second hook, and said electrical wire is pressed by said first groove and said second groove of said pressing block of said lamp cover, so that the said tip of said positive conductive sheet is inserted into an outer insulation layer of said electrical wire and then contacts a first core wire of said electrical wire, and the said tip of said negative conductive sheet is inserted into said outer insulation layer of said electrical wire and then contacts a second core wire of said electrical wire;

wherein:

said first groove and said second groove of said pressing block of said lamp cover are respectively provided with at least one first pressing protrusion and at least one second pressing protrusion for pressing the outer insulation layer of said electrical wire to achieve more stable pressing fixation and better tensile effect.

2. The improved structure of Christmas lamp holder as claimed in claim 1, wherein said at least one first pressing protrusion and said at least one second pressing protrusion of said pressing block of said lamp cover are selectively strip-shaped or block-shaped.

3. The improved structure of Christmas lamp holder as claimed in claim 1, wherein at least one first pressing protrusion and said at least one second pressing protrusion of said pressing block of said lamp cover are used to further press said outer insulation layer of said electrical wire and prohibited from interfering with said first core wire and said second core wire of said electrical wire.

* * * * *